No. 740,667. Patented October 6, 1903.

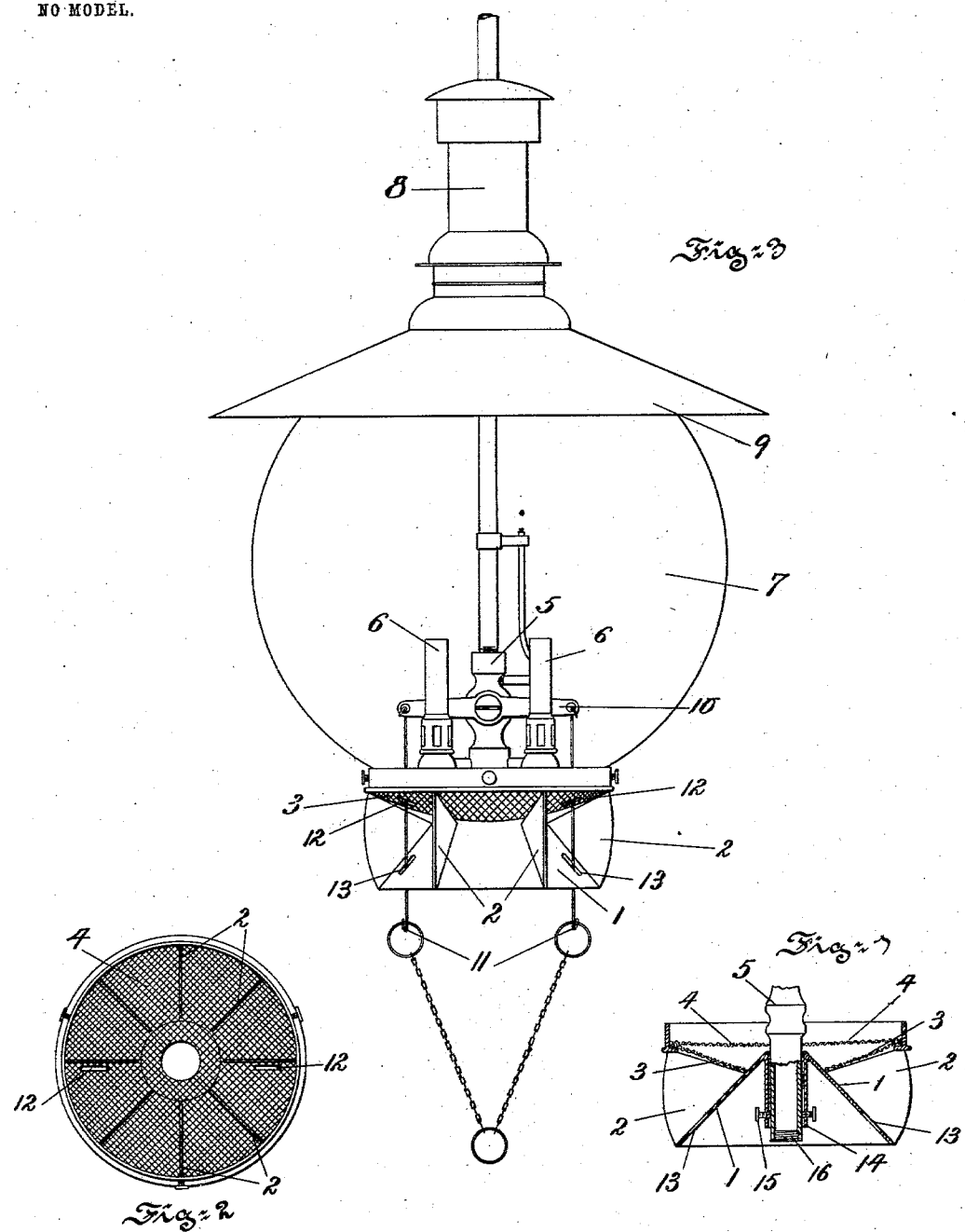

UNITED STATES PATENT OFFICE.

THOMAS J. LITLE, JR., OF PHILADELPHIA, PENNSYLVANIA.

LANTERN-BOTTOM.

SPECIFICATION forming part of Letters Patent No. 740,667, dated October 6, 1903.

Application filed June 22, 1903. Serial No. 162,501. (No model.)

*To all whom it may concern:*

Be it known that I, THOMAS J. LITLE, Jr., a citizen of the United States, residing at Philadelphia, in the county of Philadelphia and State of Pennsylvania, have invented a certain new and useful Lantern-Bottom, of which the following is a specification.

Objects of the present invention are to prevent drafts from causing flickering and unsteadiness of lights and to keep the circulation of air within a lantern the same whether the wind or drafts blow or not.

To these and other ends hereinafter set forth the invention, stated in general terms, comprises a lantern-bottom of generally conic form provided with radiating vanes or wings and having a foraminous top; and the invention further comprises a lantern-bottom of conic shape having radiating wings or vanes and having at its top a chamber between foraminous walls; and the invention further comprises the improvements to be presently described and finally claimed.

In the drawings, Figure 1 is a view, principally in central section, illustrating a lantern-bottom embodying features of the invention. Fig. 2 is a top or plan view of the same, and Fig. 3 is a side view illustrating a lantern equipped with a lantern-bottom embodying features of the invention.

In the drawings, 1 is the conic lantern-bottom, provided with radially-arranged wings or vanes 2. At the top of the wings or vanes 2 is arranged a foraminous wall 3, above which is another foraminous wall 4, so that a chamber is provided between these walls. As shown in the drawings, the lantern-bottom is carried by the pipe 5, which also carries the burners 6 and their accessories, which may be of the incandescent type. The globe 7 rests upon the bottom, and above it is arranged a wind guard or cap 8, fitted with a reflector 9.

10 is the lever for controlling the gas-supply, and its operating rods or chains 11 are shown as passing through openings 12 and 13, provided in the foraminous walls and in the conic portion of the bottom. Furthermore, as illustrated in the drawings, the conic portion 1 is provided with a sleeve 14, having set-screws 15 and arranged to be secured to the end of the pipe 5. The end of the pipe 5 is shown as provided with a screw-plug 16 and constitutes a drip.

In use drafts are directed upward through the lantern by the conic portion 1 and wings or vanes 2 and are not permitted to enter the lantern from lateral directions, so that even when the wind blows the circulation is the same—namely, upward through the lantern—as it is when the wind does not blow. The only thing that the wind does is to perhaps increase this upward circulation. The chamber between the two foraminous walls when present serves to further promote the accomplishment of the described upward circulation through the lantern.

It will be obvious to those skilled in the art to which my invention appertains that modifications may be made in detail without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. A lantern-bottom comprising a foraminous wall, a conic portion arranged below the same and provided with radially-extending wings or vanes, substantially as described.

2. A lantern-bottom comprising a chamber inclosed between foraminous walls, and a conic portion arranged below the same and provided with vanes, substantially as described.

In testimony whereof I have hereunto signed my name.

THOMAS J. LITLE, JR.

In presence of—
K. M. GILLIGAN,
W. J. JACKSON.